Sept. 8, 1964 R. W. MORRISON 3,148,347
TRANSDUCER HAVING RELATIVELY ANGULAR MOVABLE
BIFILAR PRINTED CIRCUIT-TYPE COILS
Filed Jan. 27, 1961 3 Sheets-Sheet 1

INVENTOR
Robert W. Morrison
BY
ATTORNEY

United States Patent Office 3,148,347
Patented Sept. 8, 1964

3,148,347
TRANSDUCER HAVING RELATIVELY ANGULAR MOVABLE BIFILAR PRINTED - CIRCUIT - TYPE COILS
Robert W. Morrison, Corfu, N.Y., assignor to Westinghouse Electric Corporation, East Pittsburgh, Pa., a corporation of Pennsylvania
Filed Jan. 27, 1961, Ser. No. 85,290
6 Claims. (Cl. 336—123)

The present invention relates in general to a measuring or sensing transducer device, and more particularly to a transducer device operative with a machine member for providing an indication of some physical quantity relative to that machine member such as the positional movement of said machine member.

The presently known digital control systems and numerical control systems are highly accurate in operation. However, the problem always arises of providing for such a system the necessary sensing and measurement of some physical quantity such as the positional movement and/or speed relative to a machine member or the like that is being controlled or that is related to the desired control function by such a system. The resulting accuracy of the actually realized control operation is in general limited by the least accurate component in the controlling system, and that component is usually the physical quantity sensing transducer device.

Accordingly, it is an object of the present invention to provide an improved transducer device for measuring a physical quantity, such as positional movement of a machine member, which device is more accurate in operation and better suited for use with digital signal control systems.

It is an additional object of the present invention to provide an improved position measuring transducer device operative to provide a better resolution in its operation in each of forward and a reverse direction of positional movement by a machine member operative with said transducer device.

It is a further object to provide an improved physical quantity measuring transducer device that is better operative with subsequent signal sequence sensing and counting devices and the like, which devices might include semiconductor equipment elements.

Further objects of the present invention will become apparent from the following description taken in conjunction with the accompanying drawings wherein.

Figure 1:
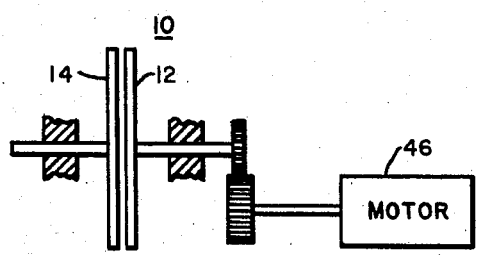
FIGURE 1 is an illustrative showing of one form of the present transducer device.

In FIG. 1 there is provided an illustrative showing on one form of the present transducer device 10. A first plate or disc member 12 is operative to carry the two input rotor windings for the transducer device 10 as will be described more fully relative to the showing of FIG. 2. The first plate or disc member 12 is rotatable relative to a fixed position second plate or disc member 14, which is shown adjacent to and in alignment with the first member 12 and operative to support the two stator or secondary windings of the present transducer device as shown more fully in FIG. 3.

Figure 2:
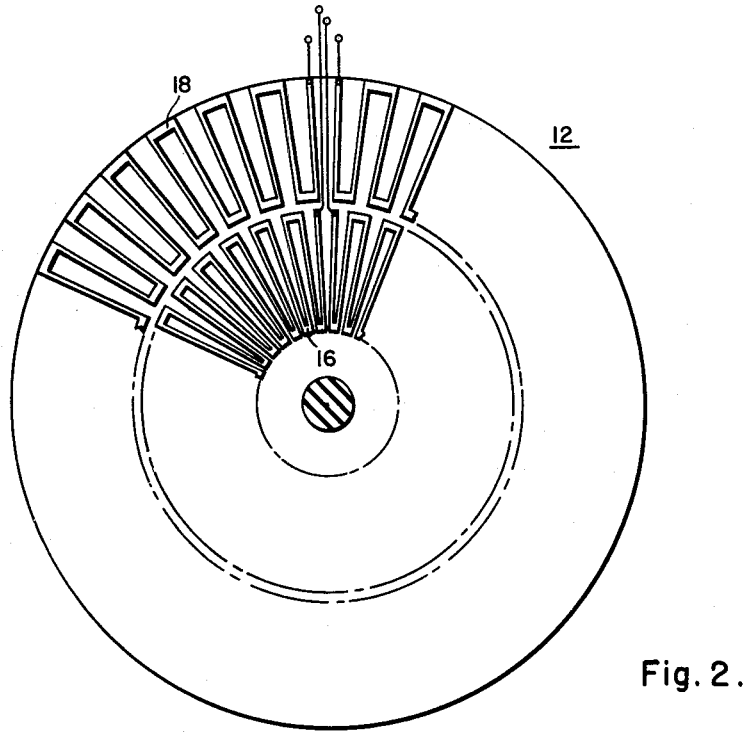
FIG. 2 is an illustrative showing of the rotor portion of the present transducer device.

In FIG. 2 there is provided an illustrative showing of the rotor disc member 12 including a first rotor winding 16, which is bifilar in form and includes a plurality of strip-like conductors that are substantially constant in width throughout their radial length. In other words, the width of each individual strip-like conductor of the rotor winding 16 remains substantially constant as the radial length increases. Adjacent conductors of the rotor winding 16 are connected together at the top and bottom alternately to form a continuous bifilar type of winding. It should be noted that the spacing between the strip-like conductors of the rotor winding 16 increases with radial distance from the center of the disc member 12.

In one form of the rotor disc member 12, which was actually constructed, the minimum physical dimension of each conductor was determined to be 0.020″. Also the minimum distance of the winding 16 from the axis or rotational center of the rotor or disc member 12 was determined to preferably be greater than 1 and $41/64$ inches in order that the natural frequency of the transducer device be kept within a suitable range for available semiconductor devices such as transistors that can be best applied.

A second rotor winding 18 is provided which similarly has a plurality of strip-like conductors that also are of substantially constant width along their radial length. It should be noted that the rotor winding 18 has the same number of strip-like conductors as the rotor winding 16 and is similarly provided with alternate connections at the top and bottom of the conductors as shown to provide a continuous bifilar type of winding.

Figure 3:
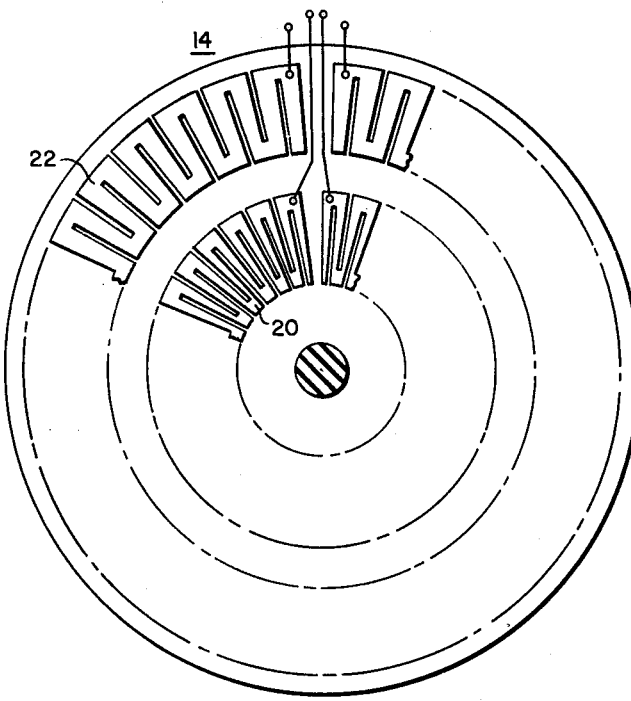
FIG. 3 is an illustrative showing of the stator of the present transducer device.

In FIG. 3 there is an illustrative showing of the stator plate or disc member 14 showing a first stator winding 20 and a second stator winding 22. The stator windings 20 and 22 are provided with a substantially constant width spacing between the adjacent conductors and are made up of a plurality of strip-like conductors connected together alternately at the top and bottom as shown in FIG. 3 to form a continuous bifilar type of winding. It should be noted that the width of the spacing between the conductors of the stator windings 20 and 22 is substantially the same as the width of the conductors of the rotor windings 16 and 18.

It should be readily apparent from the showings of FIGS. 2 and 3 that the rotor winding 16 is operative with the stator winding 20 and the rotor winding 18 is operative with the stator winding 22.

It should be further noted from the illustrative showing of FIGS. 2 and 3 that the relationship between the respective rotor windings and the stator windings is such that the ratio of the stator conductor width relative to the rotor conductor width for either the stator winding 20 compared to the rotor winding 16 or the stator winding 22 compared to the rotor winding 18 is greater than one. This provides for a non-sinusoidal carrier envelope relative to the angular motion of the rotor disc member 12 corresponding to the measured positional movement of a machine member coupled to the rotor disc member 12, which non-sinusoidal carrier envelope approaches that of a square wave. This operative feature of the present transducer device lends the output signal characteristic of the present transducer device more easily to digital measurement and control techniques.

Figure 5:
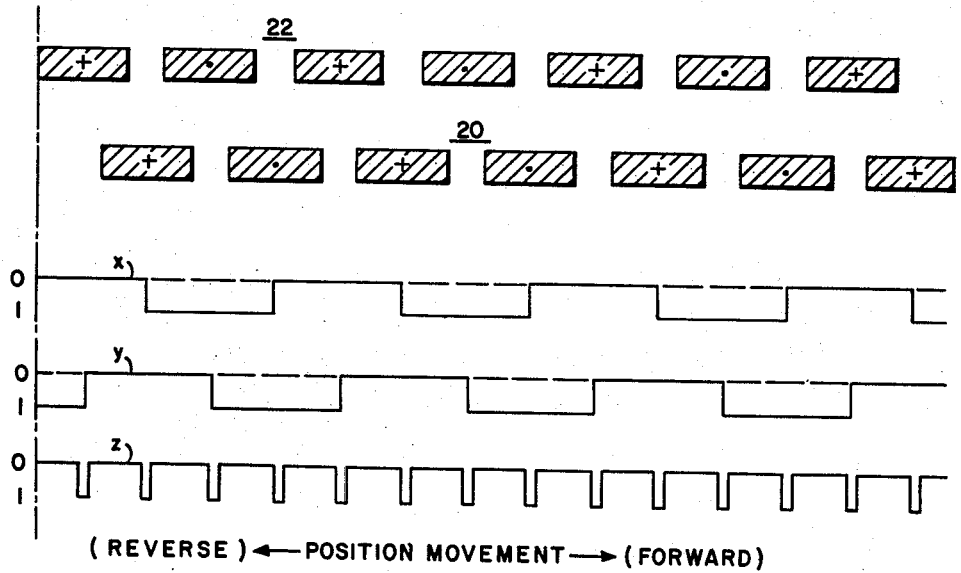
FIG. 5 is a diagrammatic showing of two stator windings and the resulting control signals provided by those windings.

For the measurement or sensing of positional movement of a machine member for each of a forward and a reverse direction, two or more stator windings are required as shown by the stator windings 20 and 22 of FIG. 3. The latter windings are arranged as concentric windings where the relative angular displacement is determined by the number of windings required for a given number of counts per revolution and by the number of stator windings used. As shown, the centerlines of the air spaces of the outside winding is displaced from the centerlines of the air spaces of the inside winding by ½ of the angle between the air space centerlines. The angles between the air space centerlines is the same and constant for each winding. The arrangement of FIGURES 2 and 3 allows a resolution of one count for every conductor as illustrated in FIG. 5.

It should be noted relative to the showing of FIG. 3 that the length of the conductors for each of the rotor windings 16 and 18 is greater than the length of the conductors of the corresponding stator windings 20 and 22. The purpose of this is to overlap on both ends of the stator conductors by the conductors of the rotor windings by an amount in the order to eight times the air space between the rotor disc member 12 and the stator disc member 14. This lessens the possibility of a non-cancelling voltage appearing at the true null position of operation of the transducer device in accordance with the present invention.

Figure 4:
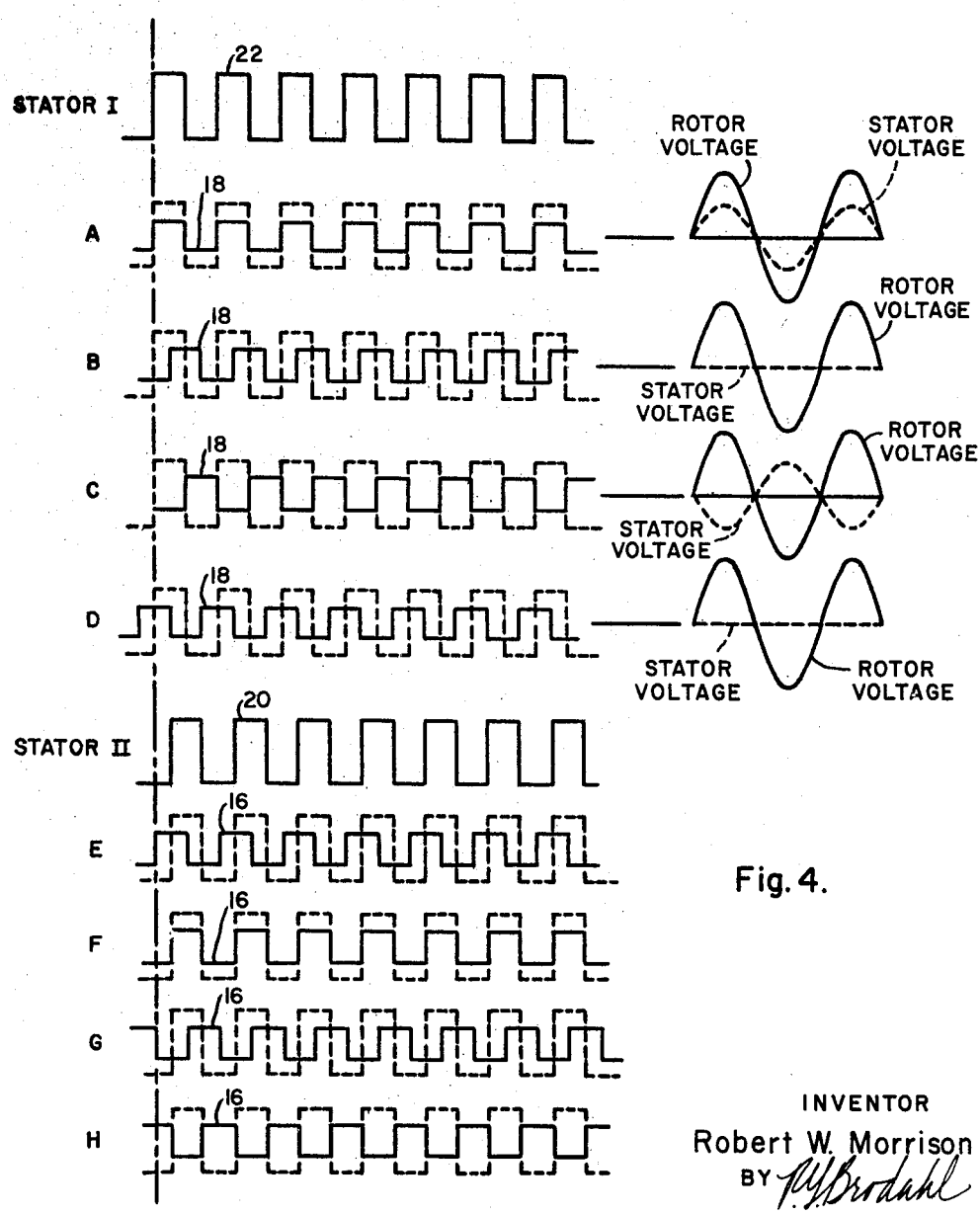
FIG. 4 is a functional showing of the transducer windings and a curve chart illustrating the operation of the present transducer device.

In FIG. 4 there is shown the operative positions of the stator winding 22 carried by the stator disc member 14 and the second stator winding 20 also carried by the stator disc member 14. The rotor winding 18 operative with the stator winding 22 is functionally shown in position charts A, B, C and D as changing in its operative position. With a high frequency signal applied to the rotor winding, such as 100 kc., the coupling coefficient between each pair of rotor and stator conductors is maximum in position A and the output voltage waveform is indicated to the right of position chart A. Although there is some capacitive coupling, the output voltage is primarily inductively induced in accordance with established principles of induction involving parallel lines. A second position B is indicated wherein the rotor winding 18 has been moved 90 electrical degrees relative to the stator winding 22 to give the null position output signal waveform as shown to the right of the position chart B. A third position C is shown wherein the rotor winding 18 has been moved 180 electrical degrees relative to the stator winding 22 to provide the output signal from the stator winding as shown to the right of position chart C. In position chart D, the rotor winding 18 has been moved 270 electrical degrees relative to the stator winding 22 to provide no output signal as shown to the right of position chart D. In this regard, the output signals are shown in a dash line relative to the applied input signal.

With further reference to the showing of FIG. 4, it should be noted that the rotor winding 18 operative with the stator winding 22 is substantially similar in position relative to the rotor winding 16 operative with the stator winding 20. In this regard, the position charts E, F, G and H shown relative to the stator winding 20 correspond respectively to the position charts A, B, C and D shown relative to the stator winding 22. The difference being the angular displacement between the stator windings 20 and 22 described earlier.

In FIG. 5 there is shown a positional illustration of the strip-like conductors of the stator winding 22 relative to the displacement of the strip-like conductors of the stator winding 20. It will be seen from the showing of FIG. 5 that a displacement of ½ air space width has been provided. The control signal X is shown as a substantially square wave signal and is provided by the electrical coupling between the rotor winding 18 relative to the stator winding 22 as the rotor varies in position for both a forward and a reverse direction positional movement of a machine member coupled to the rotor disc member 12. The square wave is provided from the output control signal shown in FIG. 4 through the provision of suitable filter and wave shaping circuits as well known to persons skilled in this art. Similarly, the control signal Y is provided by the stator winding 20 as the rotor winding 16 is rotated relative to the axis of the rotor disc member 12 in accordance with the positional movement of some machine member coupled to the rotor disc member 12. The control signal Z suitable for positional control and can be supplied to a reversible counter through signal sequence sensing apparatus for this purpose.

The present application is related to a copending patent application of the same inventor entitled "Position Control Apparatus," filed September 6, 1960, Serial No. 54,109 and assigned to the same assignee. This latter application shows a control apparatus utilizing a transducer device in accordance with the teachings of the present invention.

In one practical embodiment of the present apparatus that was actually made and operated, each of the two stator windings 20 and 22 had fifty conductors spaced 7.2 degrees apart with an air space of 0.020 inch between those conductors; the center line of the air space for winding 20 was displaced from the center line of the air space winding 22 by 3.6 degrees.

Although the present invention has been described with a certain degree of particularity, it should be understood that the present disclosure has been made only by way of example and that numerous changes in the details of construction and the combination and arrangement of parts may be resorted to without departing from the scope and spirit of the present invention.

I claim as my invention:

1. A movement sensing transducer including a first support member rotatable about an axis, a second support member, a first pair of windings disposed on said first support member and each comprising a plurality of strip-like conductors, a second pair of windings disposed on said second support member and each comprising a plurality of strip-like conductors, with one of said first pair of windings being positioned to be inductively coupled with one of said second pair of windings and with the other of said first pair of windings being positioned to be inductively coupled with the other of said second pair of windings, said conductors of the first pair of windings being of substantially uniform width and with the spacing between said conductors of the second pair of windings being of substantially uniform width.

2. A transducer device including a first support member rotatable about an axis, a second support member adjacent to and in alignment with said first support member and being fixed in position relative to said axis, a first pair of windings disposed on said first support member and each comprising a plurality of strip-like first conductors, a second pair of windings disposed on said second support member and each comprising a plurality of strip like second conductors, with one of said first pair of windings being positioned to be inductively coupled to one of said second pair of windings and with the other of said first pair of windings being positioned to be inductively coupled to the other of said second pair of windings, said first conductors of the first pair of windings being of substantially uniform width and with the spacing between said second conductors of the second pair of windings being of substantially uniform width, with the ratio of the width of said second conductors compared to the width of said first conductors being greater than one.

3. In a movement sensing transducer device operative with a movable machine member, a first support member rotatable about an axis in accordance with said movement, a second support member positioned about the same axis adjacent to and in alignment with said first support member, a first pair of windings disposed on said first support member and each winding comprising a plurality of strip-like conductors, a second pair of windings disposed on said second support member and each winding comprising a plurality of strip-like conductors, with one of said first pair of windings being inductively coupled with one of said second pair of windings and the other of said first pair of windings being inductively coupled with the other of said second pair of windings, said conductors of the first pair of windings being of substantially uniform width and with said conductors of the second pair of windings having a substantially uniform spacing therebetween.

4. A positional movement sensing transducer device including a first support member rotatable about an axis as a function of said positional movement, a second support member positioned relative to the same axis in alignment with said first support member for cooperating in a predetermined manner with said first support member, a first pair of bifilar windings disposed on said first support member and each comprising a plurality of strip-like first conductors, a second pair of bifilar windings disposed on said second support member and each comprising a plurality of strip-like second conductors, with one of said first pair of windings being arranged to be inductively coupled to one of said second pair of windings and with the other of said first pair of windings being arranged to be inductively coupled to the other of said second pair of windings, said first conductors of the first pair of windings being of substantially uniform width and with said second conductors of the second pair of windings being provided with a substantially uniform spacing therebetween, with said first conductors having a greater length than said second conductors.

5. A positional movement sensing transducer device including a first support member rotatable about an axis in accordance with said positional movement, a second support member positioned relative to the same axis in alignment with said first support member, a first pair of bifilar windings disposed on said first support member and each comprising a plurality of strip-like conductors, a second pair of bifilar windings disposed on said second support member and each comprising a plurality of strip-like conductors, with one of said first pair of windings being arranged to be inductively coupled with one of said second pair of windings and with the other of said first pair of windings being arranged to be inductively coupled with the other of said second pair of windings, said conductors of the first pair of windings being of substantially uniform width and with the spacing between said conductors of the second pair of windings being of substantially uniform width, said conductor width and said conductor spacing having a predetermined relationship.

6. A transducer device including a first support member comprising a disc of non-conducting material and being rotatable about an axis, a second support member comprising a disc of non-conducting material, a first pair of bifilar windings disposed on said first support member and each comprising a plurality of radial strip-like conductors, a second pair of bifilar windings disposed on said second support member and each comprising a plurality of radial strip-like conductors, with one of said first pair of windings being arranged to be inductively coupled with one of said second pair of windings and with the other of said first pair of windings being arranged to be inductively coupled with the other of said second pair of windings, said conductors of the first pair of windings being of substantially uniform width and with the spacing between said conductors of the second pair of windings being of substantially uniform width.

References Cited in the file of this patent

UNITED STATES PATENTS

| | | |
|---|---|---|
| 2,799,835 | Tripp et al. | July 16, 1957 |
| 2,867,783 | Childs | Jan. 6, 1959 |